US009860517B1

(12) United States Patent
Ramaswamy et al.

(10) Patent No.: US 9,860,517 B1
(45) Date of Patent: Jan. 2, 2018

(54) POWER SAVING APPROACHES TO OBJECT DETECTION

(71) Applicant: Amazon Technologies, Inc., Reno, NV (US)

(72) Inventors: Sharadh Ramaswamy, Seattle, WA (US); David Wayne Stafford, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 684 days.

(21) Appl. No.: 14/035,880

(22) Filed: Sep. 24, 2013

(51) Int. Cl.
*H04N 13/00* (2006.01)
*H04N 13/02* (2006.01)
*H04N 5/232* (2006.01)

(52) U.S. Cl.
CPC ..... *H04N 13/0242* (2013.01); *H04N 5/23241* (2013.01)

(58) Field of Classification Search
CPC ........................ G06K 9/00335; G06K 9/00771
See application file for complete search history.

(56) References Cited

U.S. PATENT DOCUMENTS

| 6,335,985 | B1* | 1/2002 | Sambonsugi | G06K 9/3241 |
| | | | | 382/190 |
| 6,681,058 | B1* | 1/2004 | Hanna | H04N 19/23 |
| | | | | 375/E7.086 |
| 6,741,977 | B1* | 5/2004 | Nagaya | H04N 5/765 |
| 8,687,104 | B2* | 4/2014 | Penov | G06K 9/6202 |
| | | | | 348/222.1 |
| 2004/0239761 | A1* | 12/2004 | Jin | G08B 13/19604 |
| | | | | 348/153 |
| 2007/0291998 | A1* | 12/2007 | Takizawa | G06K 9/00275 |
| | | | | 382/118 |

* cited by examiner

Primary Examiner — Zhubing Ren
(74) Attorney, Agent, or Firm — Polsinelli LLP

(57) ABSTRACT

Various embodiments provide a method for determining conditions associated with the presence of a user in order to perform object detection. For example, various heuristic tests can be used to identify movement within a sequence of images or to identify user engagement therewith and, if movement or user engagement is identified, stereo disparity can be computed in an attempt to detect an object within a predetermined distance of the computing device. Accordingly, if the distance of the object is within the predetermined distance, object detection is performed. If the object is beyond the threshold distance, however, object detection is not performed in order to conserve battery life of the computing device.

20 Claims, 8 Drawing Sheets

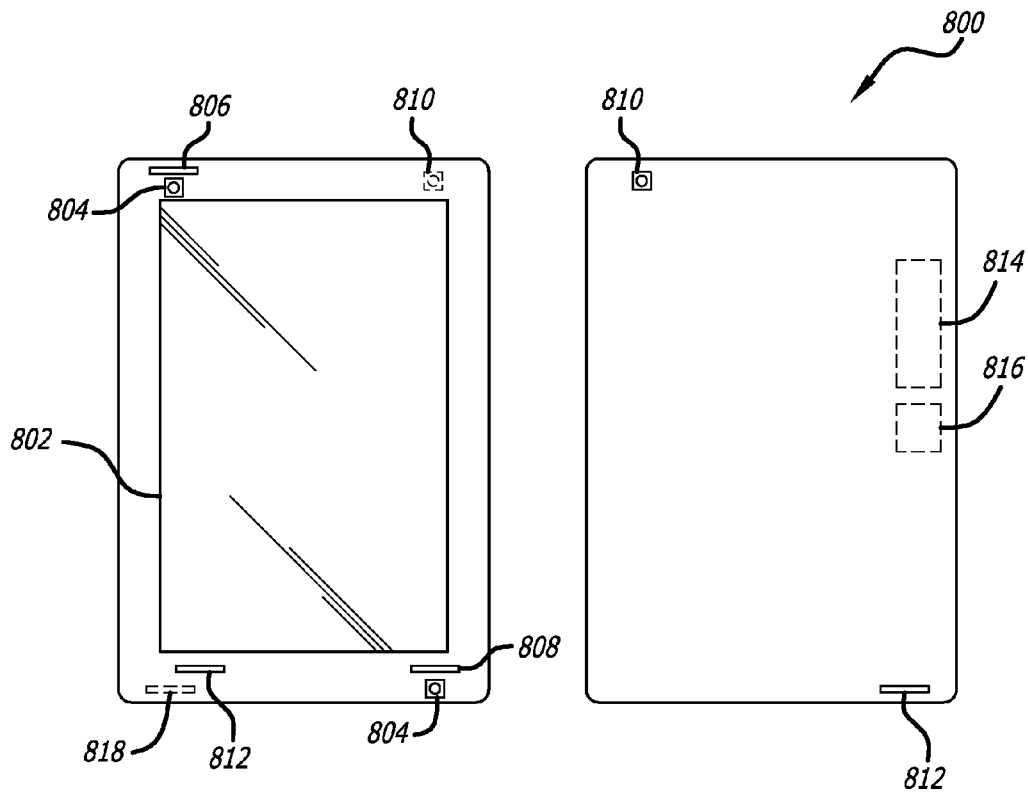
FIG. 8A
FIG. 8B
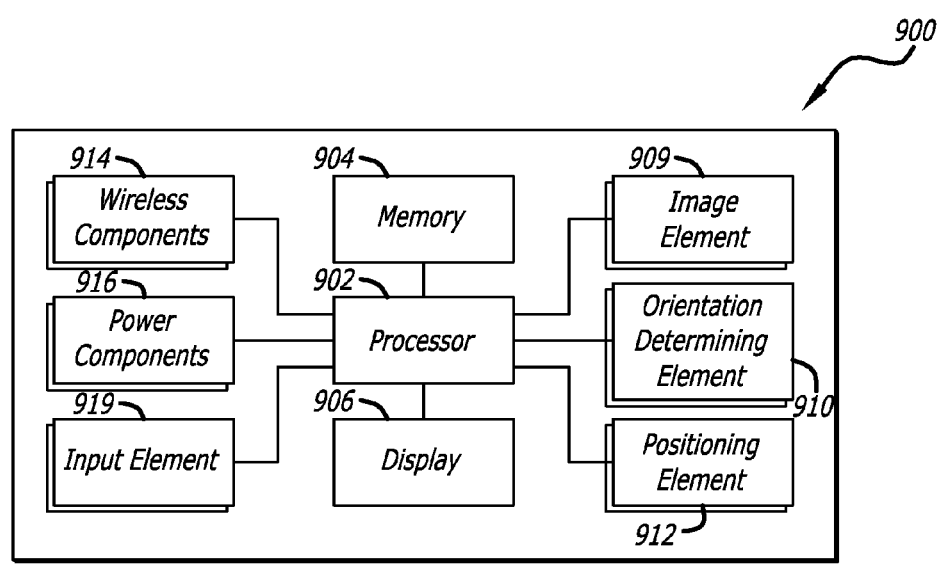
FIG. 9

POWER SAVING APPROACHES TO OBJECT DETECTION

BACKGROUND

People are increasingly utilizing portable computing devices to perform various types of tasks. Accordingly, there is a desire to increase the ways in which users can interact with the devices to perform these tasks. One interaction approach includes providing users with automatic and/or personalized services upon determining the presence of or upon recognizing the face of a user based on a digital image showing a front view of the user's face. In order to achieve this, however, a camera of the computing device must periodically capture images of an environment and process these images to determine whether a user is present therein. Such approaches can be computationally expensive, particularly for portable computing devices that have limited processing capability and/or limited battery life, which can be significantly drained by unnecessary image capture and processing. Accordingly, a less computationally expensive way for determine when to perform object detection is desirable.

BRIEF DESCRIPTION OF THE DRAWINGS

Various embodiments in accordance with the present disclosure will be described with reference to the drawings, in which:

FIGS. 8A and 8B illustrate an example computing device that can be used to implement aspects of various embodiments;

FIG. 9 illustrates example components that can be used with a device such as that illustrated in FIGS. 8A and 8B.

DETAILED DESCRIPTION

Figure 1:
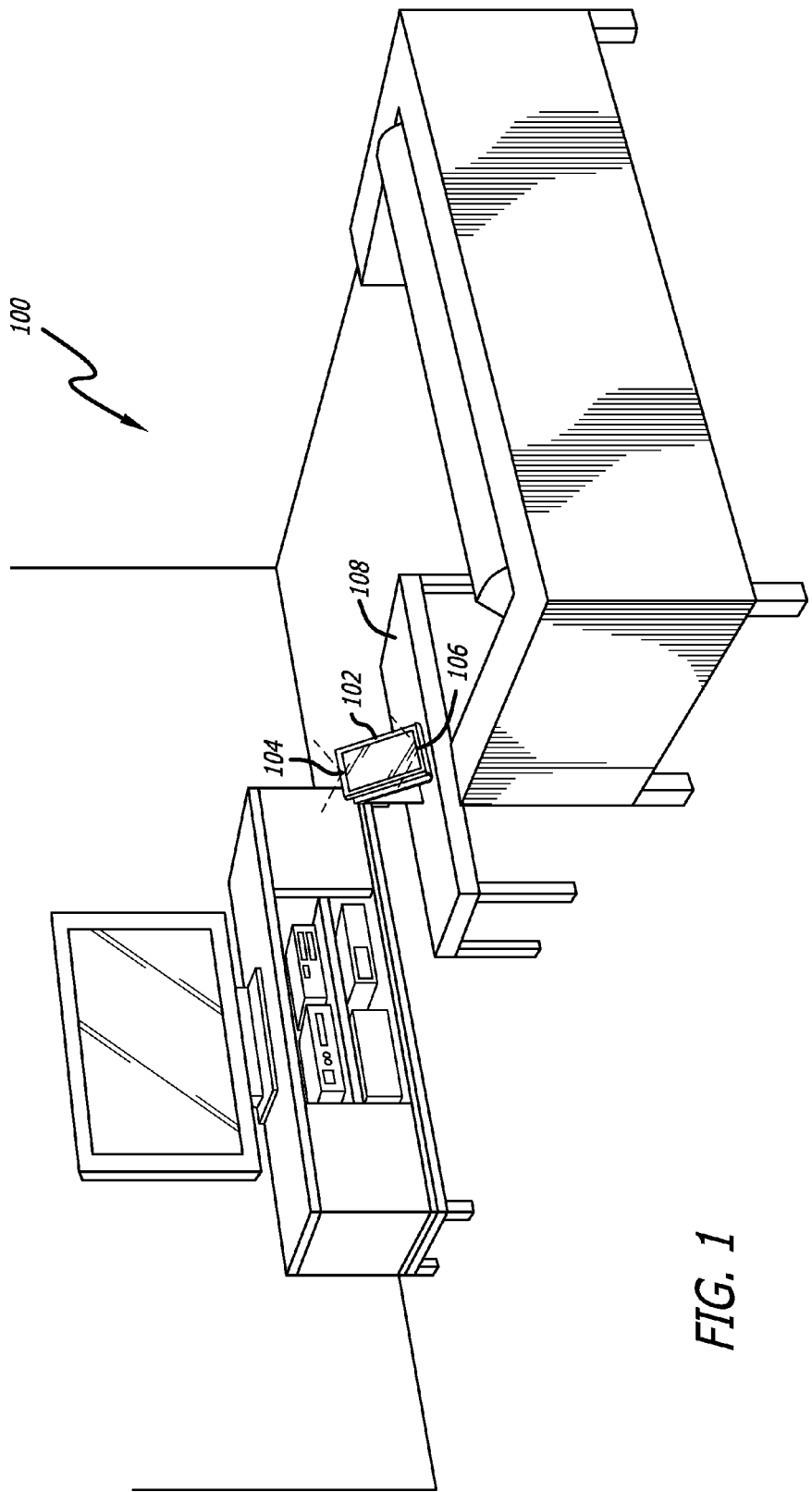
FIG. 1 illustrates an example situation of a computing device lying stationary in an environment in accordance with at least one embodiment.

Systems and methods in accordance with various embodiments of the present disclosure may overcome one or more of the aforementioned and other deficiencies experienced in conventional approaches to controlling functionality of a computing device. In particular, various approaches provide a method for determining conditions or indication of a presence of a user, such as if the user is using or is near a computing device, in order to perform object detection that may be less resource intensive than conventional approaches. For example, various heuristic tests can be used to identify movement within a series of images captured by the computing device or to identify user engagement therewith. Accordingly, if movement or user engagement is identified, stereo disparity of objects within a field of view of two cameras can be computed in an attempt to detect an object within a predetermined distance of the computing device. In various embodiments, a pair of cameras can concurrently capture image information from two different perspectives in order to provide, for example, a stereo imaging capability. By combining the images from both cameras captured at substantially the same time, an amount of disparity (i.e., horizontal or vertical displacement) of an object from the perspective of each camera can be determined and the distance of the object from the computing device can be calculated using the same. Accordingly, if the distance of the object is within a threshold distance, object detection, such as face detection, and potentially including facial or gesture recognition, is performed. If the object is beyond the threshold distance, however, object detection is not performed in order to conserve battery life of the computing device.

In one example, a heuristic test to detect motion in a video stream or periodic image sequence capture can be performed when the computing device has been stationary for a period of time. There are many approaches for motion detection and many of these approaches are based on comparing a current image frame (video) with one from a previous frame or with what is called a background or reference image. Accordingly, images from a camera of the computing device can be periodically captured and a background image can be estimated from these images by, for example, choosing the first image of a sequence of images. In another example, a mean filtering algorithm can be used to build a background image model that is composed of average pixel values from a set of images. Accordingly, since a change in pixel differences above a threshold can be used to determine motion between image frames, a sum of pixel differences between the background image and a subsequent or current image can be calculated. For example, if the sum of the pixel differences exceeds a noise value, then the chances are that an object within view of the camera has moved between image captures. Accordingly, the moving object could be a user looking at the computing device as the computing is propped up on a table or desk, for example, at which point facial detection would be appropriate and is, therefore, triggered. Other such tests to trigger facial detection can include when movement of the computing device is detected, such as if the device is picked up by a user, when user inputs are detected, or when the computing device has been unlocked from a lock screen, for example. Various other tests can be performed using different information as well within the scope of the various embodiments.

Various other functions and advantages are described and suggested below as may be provided in accordance with the various embodiments.

Object detection algorithms work by scanning an image for the presence of an object, such as a face or hand, which can be a power hungry operation. FIG. 1 illustrates an example situation 100 where computing device 102 is resting stationary on table 108 without any user interaction. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, and portable media players, among others. In this example, running an object detection algorithm (either periodically or continuously) would be a waste of the device's energy resources and will eventually drain the device's battery. Accordingly, a power efficient method to perform object detection, not just when the computing device is stationary, but also when it is near a user, such as if it is being carried in a bag and the like, is desirable.

In at least one embodiment, a sub-sampled motion detection algorithm can be periodically run when computing device 102 is stationary for a period of time. In this example, this can include calculating a sum of global pixel differences between subsampled frames captured by either (or both of) camera 104 or camera 106 to determine whether a frame-to-frame sum of absolute differences exceeds a noise threshold or the difference in random pixel value changes. In this example, sub-sampling includes determining pixel values for a subset of the total pixels of an image in order to identify foreground objects while expending as little energy or battery power as possible. Accordingly, if the sum of global pixel differences remains at or below the noise threshold, computing device 102 can return to a sleep mode or otherwise return to a state it was previously in before running the sub-sampled motion detection algorithm was run. The sum of global pixel differences rising above the noise threshold would, however, be indication of movement within a field of view of camera 104 or camera 106, as is the case when user 200 walks in front of computing device 102 and sits on the couch in FIG. 2.

Since generally an image's regions of interest are objects (e.g., head, hand, text, etc.) in an image's foreground, background subtraction can used to detect foreground objects or regions, in one example. In another example, a moving object can be detected from the difference between a current image frame and a reference image frame, often called a "background image", or "background model". In order to estimate such a background image or model, the value of each pixel (or each pixel of a subsampled region or a subsample of pixels) in the background image must be known. Accordingly, background estimation essentially refers to the process of estimating the pixel values of the background image. In one example, the pixel values from a set of images can be averaged for each pixel location to build the background image or model. For a given static camera, images with foreground objects substantially share the same background image with those without foreground objects. However, because the background is occluded by the foreground objects, it is difficult to estimate the background image from only an image which contains foreground objects. Therefore, background estimation methods often use a set of images, which are captured beforehand or on a periodic or relatively continuous basis, to average pixel values for each pixel location.

Figure 2:
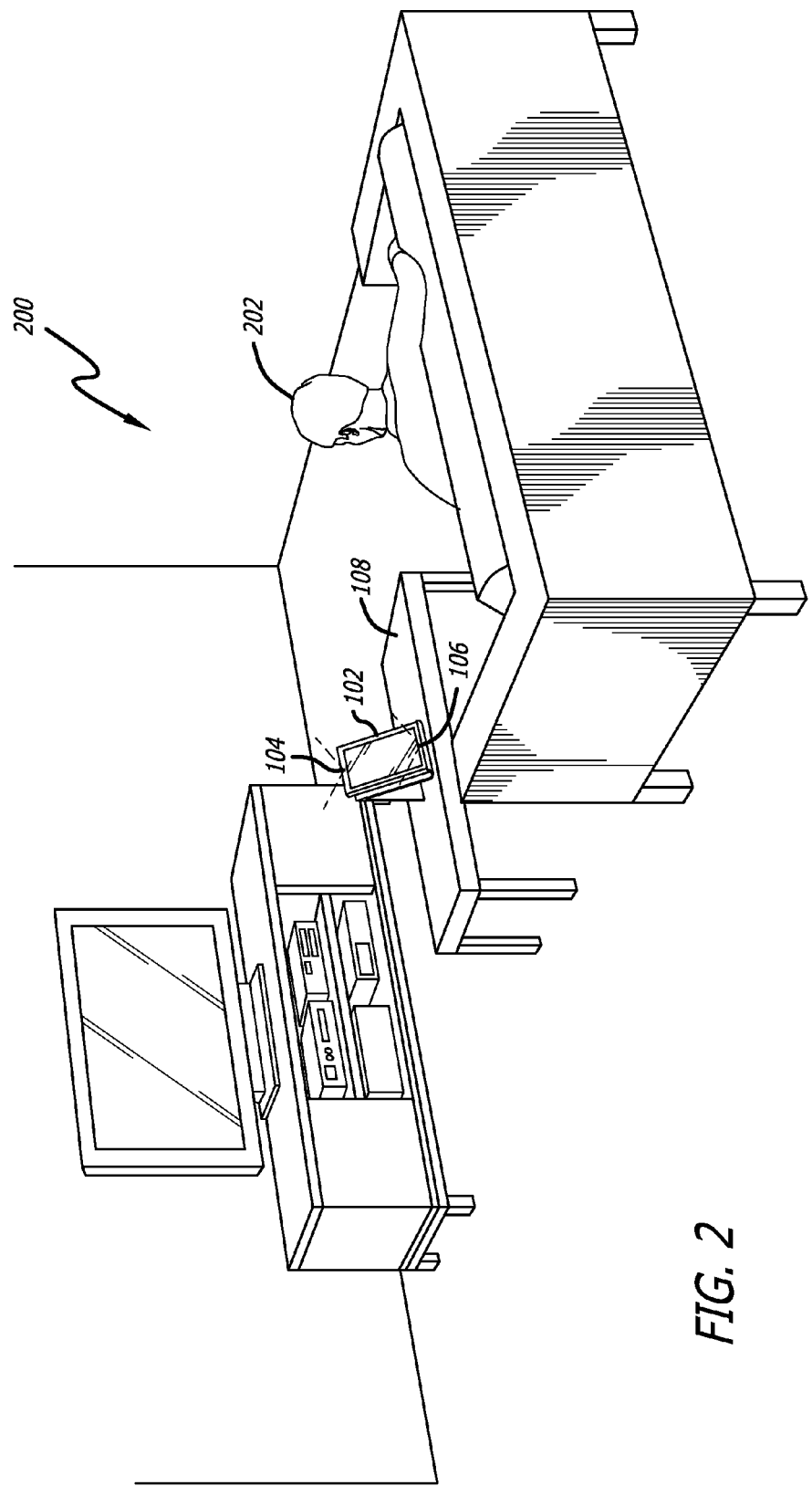
FIG. 2 illustrates another example situation of a computing device lying stationary in an environment in accordance with at least one embodiment.

FIG. 2 illustrates an example situation 200 where user 202 has walked into the room of FIG. 1 and into view of camera 104 and camera 106. As a result, the sum of global pixel differences has risen above the noise threshold and, in this example, has triggered or caused a distance calculation of objects within the field of view of camera 104 and camera 106 to be determined. In various embodiments, stereo disparity can be used to compute this distance. In this example, camera 104 and camera 106 can concurrently capture image information from two different perspectives (i.e., one at the top of computing device 102 and the other at the bottom) in order to provide, for example, a stereo imaging capability. By combining the images from both camera 104 and camera 106 captured at substantially the same time, an amount of disparity (i.e., horizontal or vertical displacement) of an object from the perspective of each camera can be determined and the distance of the object from computing device 102 can be calculated using the same. Accordingly, if the distance between the object and computing device 102 is within a threshold distance, object detection, which may further include performing facial or gesture recognition, is performed. If the object is beyond the threshold distance, however, object detection is not performed in order to conserve battery life of the computing device, since a user moving, for example, beyond the threshold distance is likely not attempting to engage the device from this distance. As used herein, facial detection refers to a broad ability to identify the presence of any user within view of a camera based on facial feature most people have in common and is typically not able to identifying differences between individual users. By contrast, facial recognition refers to the detailed ability to recognize, verify, or identify the difference between individual users.

In this example, user 200 is within the threshold distance (although the distance in the figure is not necessarily drawn to scale), causing computing device 102 to perform facial detection including capturing one or more images and analyzing the same to determine whether the object moving within the field of view of camera 104 and camera 106 is a person. Once computing device 102 captures the images, it may apply one or more facial detection algorithms to compare the features of the object (i.e., the human face) in the image to a stored model. Any number of facial detection algorithms known in the art can be utilized to compare the images to a model. For example, a facial detection algorithm may analyze the relative position, size, and/or shape of the eyes, nose, cheekbones, and jaw. These features can then be compared to the relative position, size and/or shape of the features of user 200, as defined in a model stored in the memory of computing device 102 (or retrieved from a remote location, such over a network connection). The facial detection algorithm could be user specific, such as being able to recognize individual users specifically, or it could be more general where recognizing a person in general, such as by the shape of their head, is sufficient. Accordingly, if the features match to a threshold degree of certainty, computing device 102 identifies the object as user 200.

Accordingly, upon identifying the object as user 200, computing device 102 can provide an input to an application executing thereon. For example, upon determining the object to be user 200, computing device 102 could unlock the device from a lock screen state, could activate and illuminate the display from a sleep state, could determine whether user 200 has received any notifications and display the same, and the like. In one example, user 200 could have been watching a movie on computing device 102 and, when user 200 got up and out of view of camera 104 and camera 106, computing device 102 could automatically pause the movie. Then, upon returning to the couch and, once again, recognizing user 200, computing device 102 could resume play of the movie without user 200 having to provide input thereto.

Figure 3:
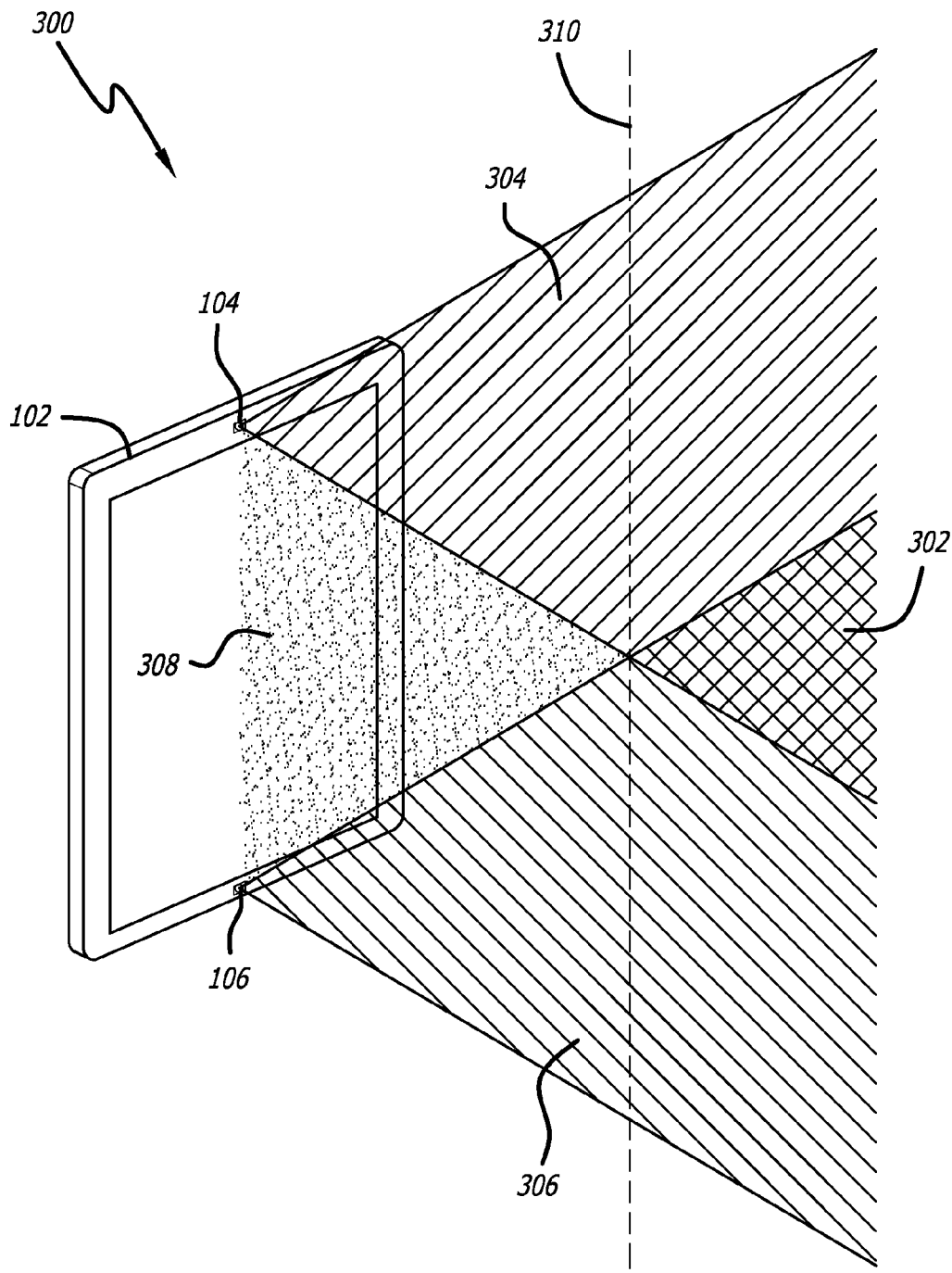
FIG. 3 example regions viewable by a pair of cameras that can be used in accordance with various embodiments.

As mentioned above, by combining the images from both camera 104 and camera 106 captured at substantially the same time, the disparity of an object from the perspective of each camera can be determined and the distance of the object from the computing device can be calculated using the same. FIGS. 3-5 explain how the distance of the object from the computing device is determined. Accordingly, FIG. 3 illustrates an example situation 300 where camera 104 and camera 106 of computing device 102 are capturing image information over respective fields of views. It should be understood that the fields of view are presented for simplicity of explanation, and that cameras of actual devices can have larger fields of view and smaller dead zones. Further, the cameras on a device might be significantly closer to each other, which can also reduce the size of the dead zones.

Using conventional stereo imaging approaches, disparity information can only be provided when an object is in view of both camera 104 and camera 106. In this example, both camera 104 and camera 106 have fields of view that overlap in region or zone 302 a distance 310 from computing device 102. Accordingly, disparity information can be provided for objects in zone 302. An object in zone 308 close to computing device 102 and between camera 104 and camera 106 cannot be seen by both cameras and, thus, disparity information cannot be provided (unless estimated from previous measurements and motion tracking, for example). Accordingly, there are two zones 304, 306 where an object can only be seen by one of camera 104 and camera 106 and where disparity information also cannot be provided since an image from at least two perspectives (i.e., both camera 104 and camera 106) is required to provide the same.

Figure 4A:
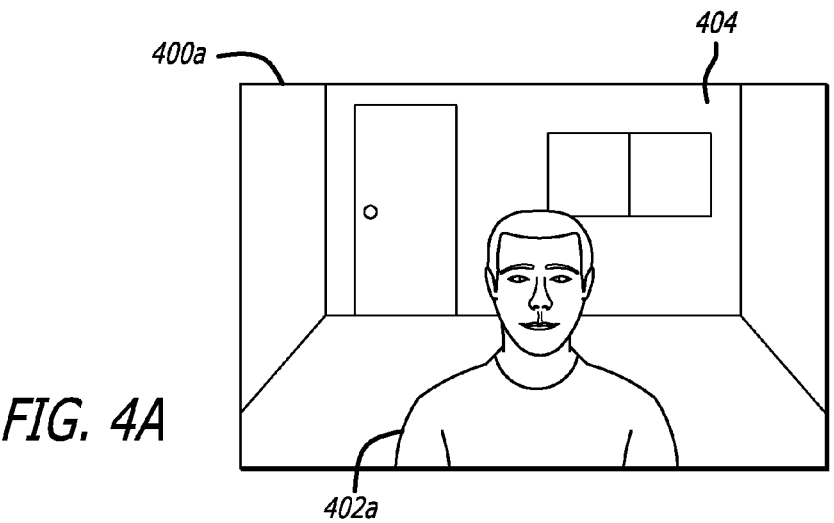
FIG. 4A illustrates an example image of an object captured with a first camera of a computing device in accordance with at least one embodiment.
Figure 4B:
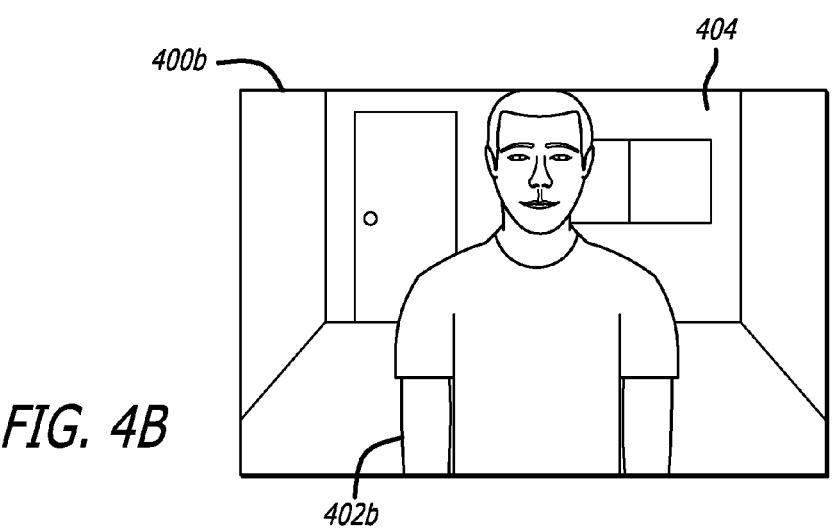
FIG. 4B illustrates an example image of the object from FIG. 4A captured with a second camera of the computing device in accordance with at least one embodiment.
Figure 4C:
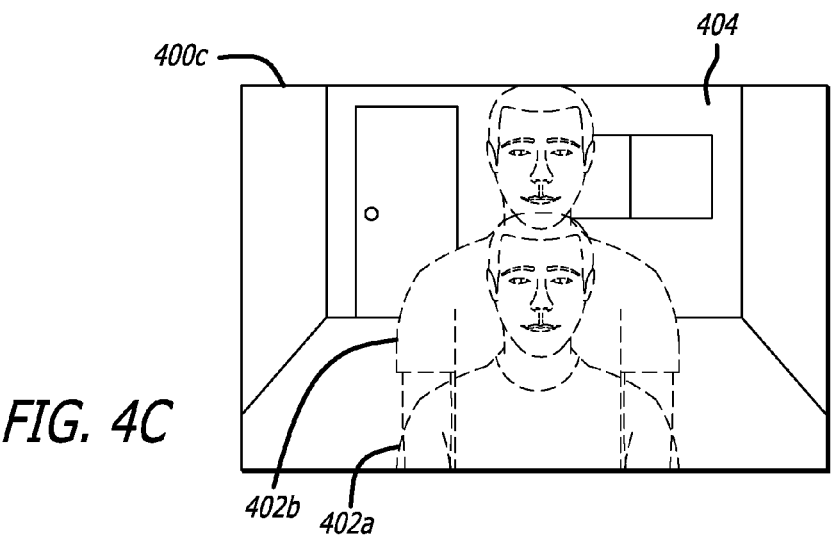
FIG. 4C illustrates an example disparity between images of the object from FIG. 4A and FIG. 4B in accordance with at least one embodiment.
Figure 5:
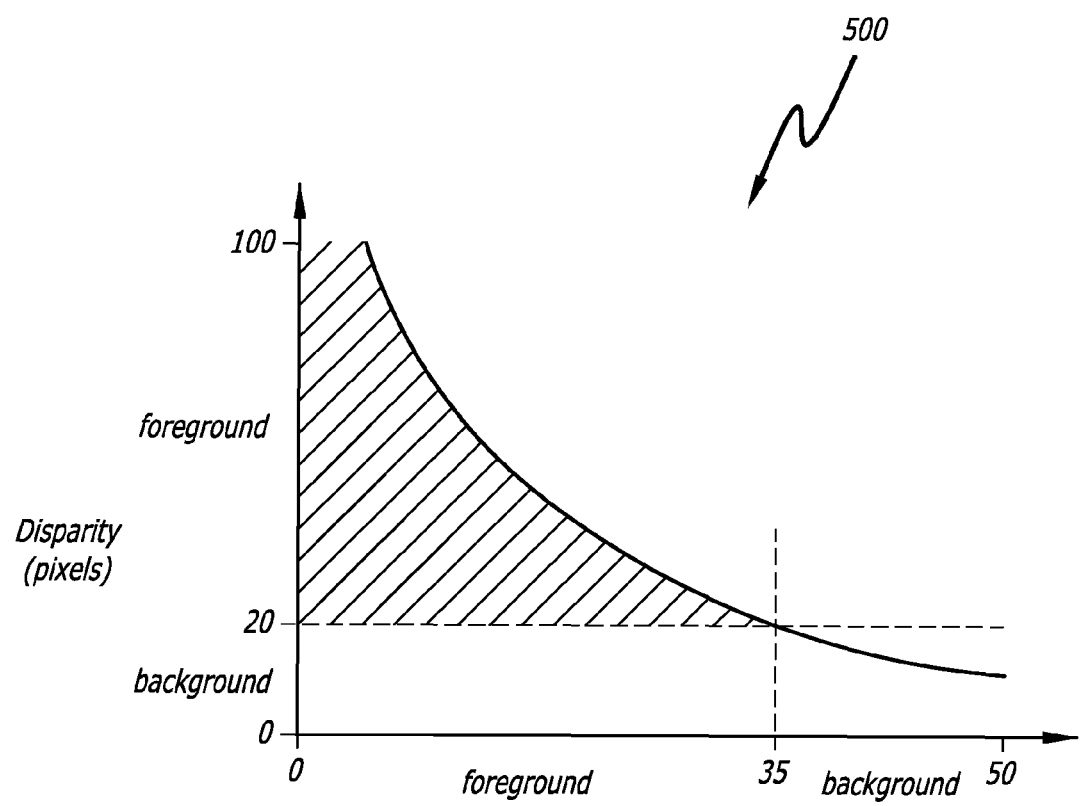
FIG. 5 illustrates an example plot of disparity versus distance that can be used in accordance with various embodiments.

FIGS. 4A and 4B illustrates example images 400a and 400b each taken at substantially the same time by two cameras, such as camera 104 and camera 106 of computing device 102. In this example, image 400a shows a user standing in room 404 in a first position 402a and image 400b shows the user a second position 402b. In this example, first position 402a shows the user located towards the bottom of image 400a and the second position 402b shows the user located closer towards the top of image 400b. This disparity or difference between the location of the user in these images is a result of the difference in location of camera 104 and camera 106 on computing device 102. FIG. 4C shows a combination 400c of images 400a and 400b to further illustrate this disparity. Accordingly, the disparity is a function of distance away from computing device 102 with the disparity being greater for objects close to the device relative to objects farther away. To illustrate this point, features of room 404 do not change between image 400a and image 400b.

FIG. 5 illustrates an example plot 500 showing a relationship of disparity with distance. As illustrated, the amount of disparity is inversely proportional to the distance from the cameras, such that there can be significantly more disparity in a near camera field (e.g., 0-1 m) relative to a far field (e.g., 1 m-infinity). Further, the decrease is not linear but decreases more quickly near the device than at a distance, as objects in the distance can have little to no disparity regardless of whether they are twenty feet away or a mile away. By examining disparity relationship curve 500 or a function associated therewith, computing device 102 (or an application or user of the device) can determine or predict an amount of disparity for configuration parameters of computing device 102 (e.g., camera resolution, camera separation, field of view, etc.). Using this information, the device can analyze objects in the stereo images, and can determine the distance to objects within a field of view of camera 104 and camera 106. For example, the amount of disparity, D, at a given distance, d, can be given by:

$$D = \frac{f \times B}{d}$$

where f is the focal length of each of camera 104 and camera 106 and B is the baseline, or distance between camera 104 and camera 106 based at least in part upon their relative positions and separation. In one example, if the focal length of a camera is four hundred pixels and the baseline is five centimeters, for a distance of one meter, the disparity would be twenty pixels. Similarly, this equation can be rearranged to determine the distance d.

Accordingly, once movement or user engagement with computing device 102 is identified, the disparity of objects within the field of camera 104 and camera 106 can be determined and, subsequently, the distance of the objects can be determined in an attempt to detect whether an object is within a predetermined distance of computing device 102. In one example, the predetermined distance could be thirty-five inches. Therefore, if an object is determined to be within thirty-five inches, computing device 102 will activate facial detection to determine whether the object is a user.

In at least one embodiment, computing device 102 can include an infrared detector or motion sensor, for example, which can be used to activate facial or object detection. If an infrared detector (i.e., a detector with one-pixel resolution that detects changes in state) detects a user entering the room, for example, the device can activate object detection such that the device can be ready when needed by the user, but conserve power and resources when a user is not nearby. Further, a motion sensor, such as an accelerometer, an inertial sensor, an electronic compass, or an electronic gyroscope, can be used a trigger to initiate object detection upon detection movement of computing device 102. In one example, in order to trigger object detection, computing device 102 could require both detected motion from a motion sensor and light and detected by, for example, a camera or other light sensor.

Figure 6:
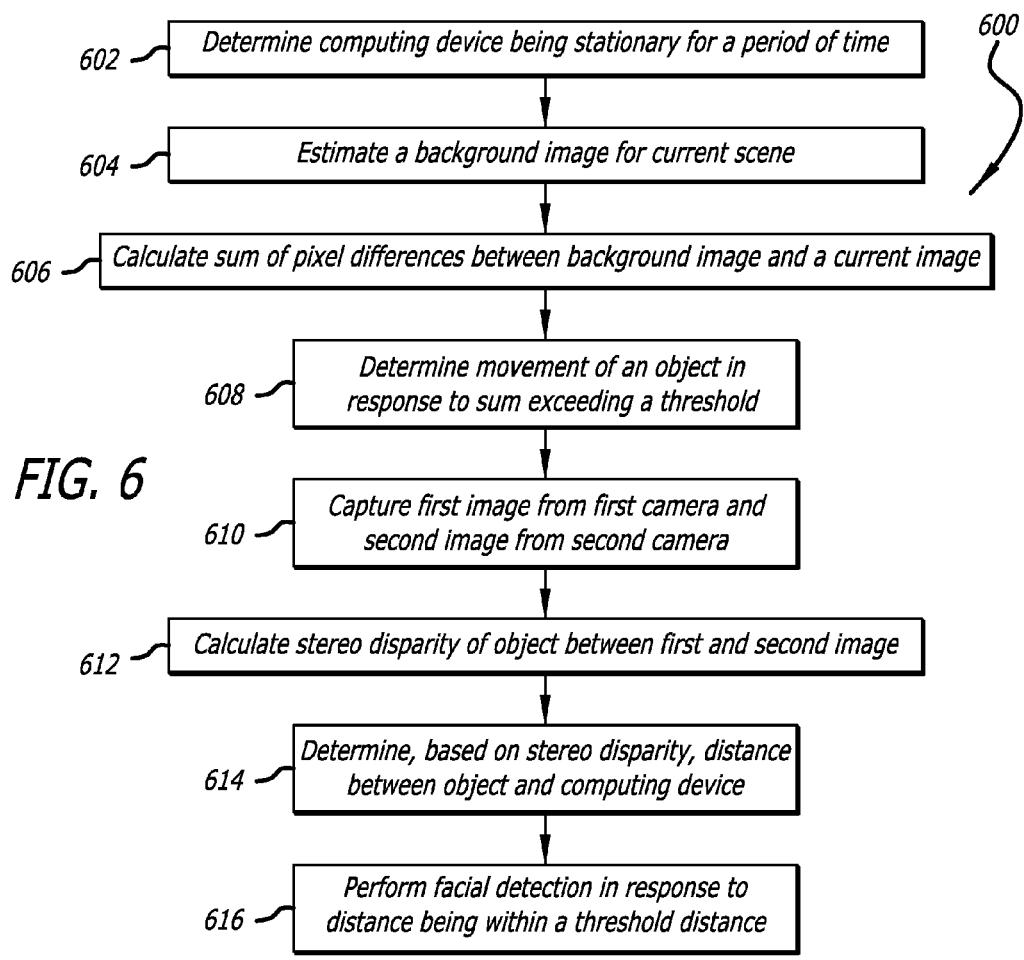
FIG. 6 illustrates an example process for performing facial detection on a computing device that can be used in accordance with various embodiments.

FIG. 6 illustrates an example process 600 for determining whether a user is either using or near a computing device in order to perform facial detection that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a computing device is determined to be stationary for a period of time 602. In one example, the computing device could be resting on a table or the user could be sleeping, at which point performing facial detection would be a waste of energy resources. In this example, a background image is estimated 604 and a sum of pixel differences between the background image and a current or subsequent image can be calculated 606, which more specifically includes determining pixel value differences between the estimated background image and the current image and summing these differences. Accordingly, if the sum of the pixel differences exceeds a threshold, such as a noise threshold, movement is determined to have occurred 608. In response to the determined movement, a third image from a first camera and a fourth image from a second camera is captured 610. In this example, the stereo disparity of the object between the third and fourth image is calculated 612.

Based on the calculated disparity, a distance between the object and the computing device is determined 614. Accordingly, object detection is then performed in response to the determined distance being less than a threshold distance.

Figure 7:
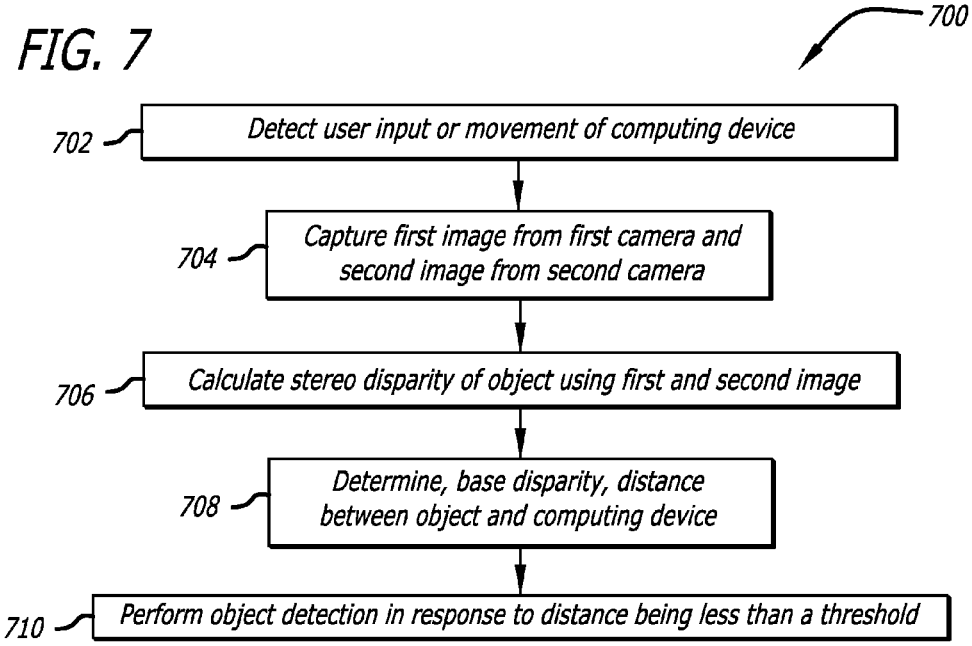
FIG. 7 illustrates an example process for preforming object detection on a computing device that can be used in accordance with various embodiments.

FIG. 7 illustrates another example process 700 for determining whether a user is either using or near a computing device in order to perform object detection that can be used in accordance with various embodiments. In this example, conditions indicative of the presence of a user, such as detecting user inputs, detecting movement of the computing device using an accelerometer, an inertial sensor, an electronic compass, an electronic gyroscope, and the like, detecting changes in sound levels, or the like is detected 702. In response, a first image of an object is captured with first camera and a second image is captured with a second camera 704. In this example, the stereo disparity of the object between the first and second image is calculated 706. Based on the disparity, a distance between the object and the computing device is determined 708. Further, various other ways to determine an objects distance from the computing device, such as using a structured light method, a proximity sensor, and the like, could also be used. Accordingly, in response to the distance being less than a threshold distance, object detection is performed 710.

As mentioned above, the object detection performed can include gesture recognition. For example, a user can make a gesture with a feature such as one of the user's hands while the computing device captures image information, such as one or more images (or video), for the feature. The captured image information can be analyzed by the computing device (or a system, or service in communication with the computing device) in order to attempt to recognize the gesture. Accordingly, the recognition of the gesture can cause a corresponding action or function to be performed, such as to open an application, unlock certain functionality, or perform another such function. In at least some embodiments, the computing device determines position information for one or more features of the user's hand at one point in time and/or changes in the position information over a period of time, as represented in the captured image(s). The position information can be compared to position information stored for the user for use in identifying an application or function associated with a particular gesture.

In various embodiments, the captured image(s) can be analyzed to attempt to determine the location of distinguishing features of the symbol, or of user's hand itself. The locations of these features are then compared to hand gesture information stored in, for example, a library of hand gestures for the user. Upon identifying a match with at least a minimum level of certainty, an input to an application executing on the computing device is provided, for example. The hand gesture can include a single "static" gesture, such as a specific letter in sign language, for example, or include two or more "static" gestures. In at least some embodiments, the gesture can include motion, such as movement of a user's hand, a specific movement of a specific symbol, or movement associated with drawing a symbol in the air above the computing device with a finger, for example. The movement could be associated with a specific path or transition from a first "static" gesture to a second "static" gesture. These gestures can be customizable by the user and assigned to various functions or applications as shortcuts or as a security layer alternative to inputting a password or passcode to unlock a device or application.

FIGS. 8A and 8B illustrate front and back views, respectively, of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
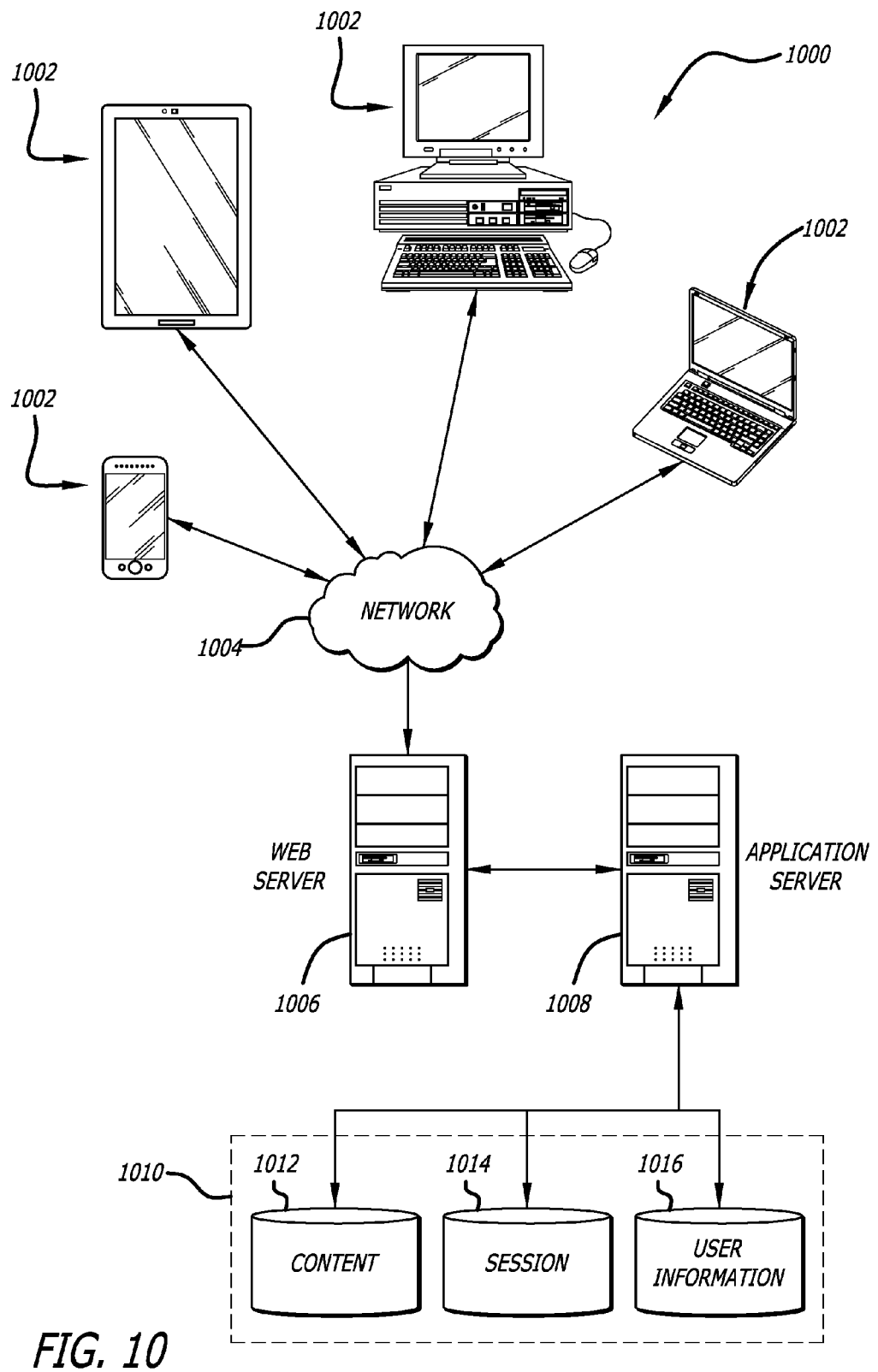
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium including instructions that, when executed by a processor of a computing device, cause the computing device to:
    receive first image data that represents a set of images of an environment from at least one of a first camera or a second camera of the computing device;
    determine, using the first image data, a first sum of pixel values that represent an estimate of a background image;
    receive second image data that represents a current image captured by the first camera;
    determine, using the second image data, a second sum of pixel values that represents the current image;
    determine a difference between the first sum of pixel values and the second sum of pixel values;
    identify a presence of an object in the current image when the difference between the first sum and the second sum meets or exceeds a threshold value;
    receive third image data that represents the current image captured by the second camera;
    determine a disparity between the object represented in the second image data and the object represented in the third image data;
    determine a distance between the object and the computing device based on the disparity;
    determine features of the object when the distance between the object and the computing device is within a threshold; and
    analyze the features using a facial detection algorithm.

2. The non-transitory computer-readable storage medium of claim 1, wherein the instructions, when executed to determine the first sum of pixel values that represent the estimate of the background image, further cause the computing device to:
    determine a first average of the pixel values that represent at least a portion of the estimate of the background image;
    determine a second average of the pixel values that represent the current image; and
    identify the presence of the object in the current image when the difference between the first average and the second average meets or exceeds the threshold value.

3. The non-transitory computer-readable storage medium of claim 1, wherein the disparity includes an amount of change between the object represented in the first image and the object represented in the second image.

4. A computer-implemented method, comprising:
    under the control of one or more computer systems configured with executable instructions,
    determining a first sum of pixel values that represent a background image from a set of images captured by at least one of a first camera or a second camera of a computing device;
    determining a second sum of pixel values that represent a current image;
    determining a difference between the first sum of pixel values and the second sum of pixel values;
    identifying a presence of an object in the current image when the difference between the first sum and the second sum meets or exceeds a threshold value;
    determining a first representation of the object in first image data captured by the first camera;
    determining a second representation of the object in the second image data captured by the second camera;
    determining a disparity between the first representation and the second representation;
    determining, based at least in part on the disparity, a distance between the object and the computing device;
    determining that the distance is less than a threshold distance;
    determining features of the object; and
    analyzing the features using an object detection algorithm.

5. The computer-implemented method of claim 4, further comprising:

comparing the features to stored feature information associated with a user;
determining a similarity value between the features and the stored feature information; and
determining the object is the user based on the similarity value meeting or exceeding a threshold similarity value.

6. The computer-implemented method of claim 4, wherein the object is at least one of a user, a head of the user, or a hand of the user.

7. The computer-implemented method of claim 4, further comprising:
detecting a user provided an input to the computing device; and
providing a signal, in response to the detected input, causing the first image data and the second image data to be captured.

8. The computer-implemented method of claim 4, further comprising:
determining movement of the object when the presence of the object is identified; and
providing a signal causing the first image data and the second image data to be captured.

9. The computer-implemented method of claim 4, further comprising:
determining the background image based on an average of the pixel values that represent the current image.

10. The computer-implemented method of claim 4, wherein the threshold value represents a noise pixel value.

11. The computer-implemented method of claim 4, further comprising:
detecting, using a motion sensor, motion of the computing device, the motion sensor including at least one of an accelerometer, an inertial sensor, an electronic compass, or an electronic gyroscope; and
providing a signal causing the first image data and the second image data to be captured based on the motion of the computing device.

12. The computer-implemented method of claim 4, further comprising:
capturing image information using at least one of the first camera or the second camera;
detecting, using a subsampled motion detection algorithm, movement in the image information; and
providing a signal causing the first image data and the second image data to be captured based on the movement in the image information.

13. The computer-implemented method of claim 4, wherein the object detection algorithm includes at least one of facial recognition algorithm or gesture recognition algorithm.

14. A computing device, comprising:
a processor;
a first camera;
a second camera;
a display screen; and
memory including instructions that, when executed by the processor, cause the computing device to:
determine a first sum of pixel values that represent a background image from a set of images captured by one of the first camera or the second camera;
determine a second sum of pixel values that represent a current image;
determine a difference between the first sum of pixel values and the second sum of pixel values;
identify a presence of an object in the current image when the difference between the first sum and the second sum meets or exceeds a threshold value;
determine a first representation of the object in first image data captured by the first camera;
determine a second representation of the object in second image data captured by the second camera;
determine a disparity between the first representation and the second representation;
determine, based at least in part on the disparity, a distance between the object and the computing device;
determine that the distance is less than a threshold distance;
determine features of the object; and
analyze the features using an object detection algorithm.

15. The computing device of claim 14, wherein the instructions, when executed by the processor to analyze the features, further cause the computing device to:
compare the features to stored feature information associated with a user;
determine a similarity value between the features and the stored feature; and
determine the object is the user based on the similarity value meeting or exceeding a threshold value.

16. The computing device of claim 14, wherein the object is at least one of a user, a head of the user, or a hand of the user.

17. The computing device of claim 14, wherein the instructions, when executed by the processor, further cause the computing device to:
determine movement of the object when the presence of the object is identified; and
provide a signal causing the first image data and the second image data to be captured.

18. The computing device of claim 17, wherein the difference between the first sum and the second sum meets or exceeds a noise pixel value.

19. The computing device of claim 14, wherein the instructions, when executed by the processor, further cause the computing device to:
detect an input provided by a user; and
provide a signal causing the first image data and the second image data to be captured based on the input.

20. The computing device of claim 14, wherein the instructions, when executed by the processor, further cause the computing device to:
detect, using a motion sensor, motion of the computing device; and
provide a signal causing the first image data and the second image data to be captured based on the motion of the computing device.

* * * * *